(12) United States Patent
Gregorski et al.

(10) Patent No.: US 11,840,473 B2
(45) Date of Patent: Dec. 12, 2023

(54) TRANSLATING FLUID BEARINGS DURING AN OPTICAL FIBER DRAW PROCESS

(71) Applicant: CORNING INCORPORATED, Corning, NY (US)

(72) Inventors: Steven Joseph Gregorski, Painted Post, NY (US); Kenneth Spencer Morgan, Painted Post, NY (US); Richard Alan Quinn, Horseheads, NY (US); Bradley Kent Shepard, Wilmington, NC (US); John Christopher Thomas, Elmira, NY (US); David Andrew Tucker, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 148 days.

(21) Appl. No.: 17/411,148

(22) Filed: Aug. 25, 2021

(65) Prior Publication Data
US 2022/0073408 A1    Mar. 10, 2022

Related U.S. Application Data

(60) Provisional application No. 63/075,983, filed on Sep. 9, 2020.

(30) Foreign Application Priority Data

Sep. 28, 2020 (NL) .................................... 2026551

(51) Int. Cl.
*C03B 37/03* (2006.01)
*B29D 11/00* (2006.01)
(Continued)

(52) U.S. Cl.
CPC ...... *C03B 37/032* (2013.01); *B29D 11/00721* (2013.01); *C03B 37/0253* (2013.01);
(Continued)

(58) Field of Classification Search
CPC .............................. C03B 37/03; C03B 37/032
See application file for complete search history.

(56) References Cited

U.S. PATENT DOCUMENTS 6,519,404 B1   2/2003  Yoshida et al.
7,937,971 B2   5/2011  Costello et al.
(Continued)

FOREIGN PATENT DOCUMENTS

| JP | 08-091705 A    | 4/1996 |
| JP | 2003-146689 A  | 5/2003 |
| JP | 2016-147771 A  | 8/2016 |

OTHER PUBLICATIONS

Dutch Patent Application No. 2026551, Search Report dated May 25, 2021, 8 pages, Dutch Patent Office.

*Primary Examiner* — Lisa L Herring
(74) *Attorney, Agent, or Firm* — Amy T. Lang (57) ABSTRACT

A method of manufacturing an optical fiber, the method including drawing a bare optical fiber from an optical fiber preform along a draw pathway. The method further includes during the drawing step, moving a first fluid bearing from a first position to a second position, the first position being removed from the draw pathway and the second position being disposed in the draw pathway such that the movement of the first fluid bearing to the second position causes at least a first portion of the draw pathway to change direction.

15 Claims, 9 Drawing Sheets

(51) Int. Cl.
*C03B 37/025* (2006.01)
*C03B 37/027* (2006.01)
*B29L 11/00* (2006.01)

(52) U.S. Cl.
CPC . *C03B 37/02718* (2013.01); *B29L 2011/0075* (2013.01); *C03B 2205/56* (2013.01)

(56) References Cited

U.S. PATENT DOCUMENTS

| | | |
|---|---|---|
| 10,202,301 B2 | 2/2019 | Okada |
| 10,479,720 B2 | 11/2019 | Dunwoody et al. |
| 2016/0168008 A1* | 6/2016 | Bookbinder .......... C03B 37/025 65/435 |
| 2016/0229734 A1* | 8/2016 | Okada ................. C03B 37/0253 |
| 2019/0193982 A1 | 6/2019 | Bumgarner et al. |
| 2019/0256400 A1 | 8/2019 | Bookbinder et al. |
| 2019/0359517 A1 | 11/2019 | Argaw et al. |

\* cited by examiner

TRANSLATING FLUID BEARINGS DURING AN OPTICAL FIBER DRAW PROCESS

This application claims the benefit of priority to Dutch Patent Application No. 2026551 filed on Sep. 28, 2020, which claims priority from U.S. Provisional Patent Application Ser. No. 63/075,983 filed on Sep. 9, 2020, the content of which is relied upon and incorporated herein by reference in its entirety.

FIELD

The present disclosure is generally directed to translating fluid bearings during an optical fiber draw process, and more particularly relates to systems and methods for translating fluid bearings to increase a fiber draw path during an optical fiber draw process.

BACKGROUND

Traditionally, optical fibers are drawn from an optical fiber preform along a vertical, linear path, such that the linear path extends in a top to bottom direction. Therefore, the optical fiber preform is disposed at a top position, and the optical fiber is drawn downwardly from the top position. However, such a vertical, linear draw pathway makes it difficult to add to or modify the draw process without adding height to the overall system. In some cases, the draw tower of an optical draw pathway is already at or near the ceiling of the building in which it is located. Therefore, adding a component to the linear draw pathway (for example, to add an improvement to the system) requires additional construction to add height to the building housing, which can be very costly.

SUMMARY

Optical fiber draw processes that are not strictly vertical significantly reduce the cost of implementing modifications or updates to the system. For example, a draw pathway that extends horizontally along a portion of the draw pathway allows for modifications to the system, including the addition of components, in an easy and cost effective manner. With such a horizontally extending draw pathway, the addition of a new component to the system would not require construction to add height to the building housing in which the system is located.

Furthermore, draw pathways that extend at least partially in a horizontal direction advantageously provide increased cooling time of the optical fiber before the optical fiber is coated with a polymeric coating. Thus, such draw pathways may eliminate or reduce the need for costly cooling mechanisms along the pathway. The draw pathways disclosed herein provide more efficient process paths that enable the use of lower cost polymeric coatings, higher coating speeds, and provide for improved fiber cooling technologies.

The embodiments disclosed herein provide optical fiber draw systems and processes in which a draw pathway extends in both vertical and non-vertical directions. Additionally, the draw pathways may change direction during the draw process, thus increasing the adaptability of the system.

In a first aspect, a method of manufacturing an optical fiber is disclosed. The method comprises drawing a bare optical fiber from an optical fiber preform along a draw pathway. During the drawing step, a first fluid bearing moves from a first position to a second position, the first position being removed from the draw pathway and the second position being disposed in the draw pathway such that the movement of the first fluid bearing to the second position causes at least a first portion of the draw pathway to change direction.

In a second aspect, an apparatus for manufacturing an optical fiber is disclosed. The apparatus comprises a drawing mechanism configured to draw a bare optical fiber from an optical fiber preform along a draw pathway. Additionally, the apparatus comprises a first fluid bearing configured to move from a first position to a second position during the drawing of the optical fiber, the first position being removed from the draw pathway and the second position being disposed in the draw pathway such that the movement of the first fluid bearing to the second position causes at least a first portion of the draw pathway to change direction.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 3A-3C are schematic illustrations of an optical fiber production system, according to one or more embodiments shown and described herein;

FIGS. 4A-4D are schematic illustrations of an optical fiber production system, according to one or more embodiments shown and described herein;

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the desired and other exemplary embodiments without departing from the spirit of the present disclosure.

Reference will now be made in detail to the present preferred embodiments of the disclosure, examples of which are illustrated in the accompanying drawings. Whenever possible, the same reference numbers will be used throughout the drawings to refer to the same or like parts.

Figure 1A:
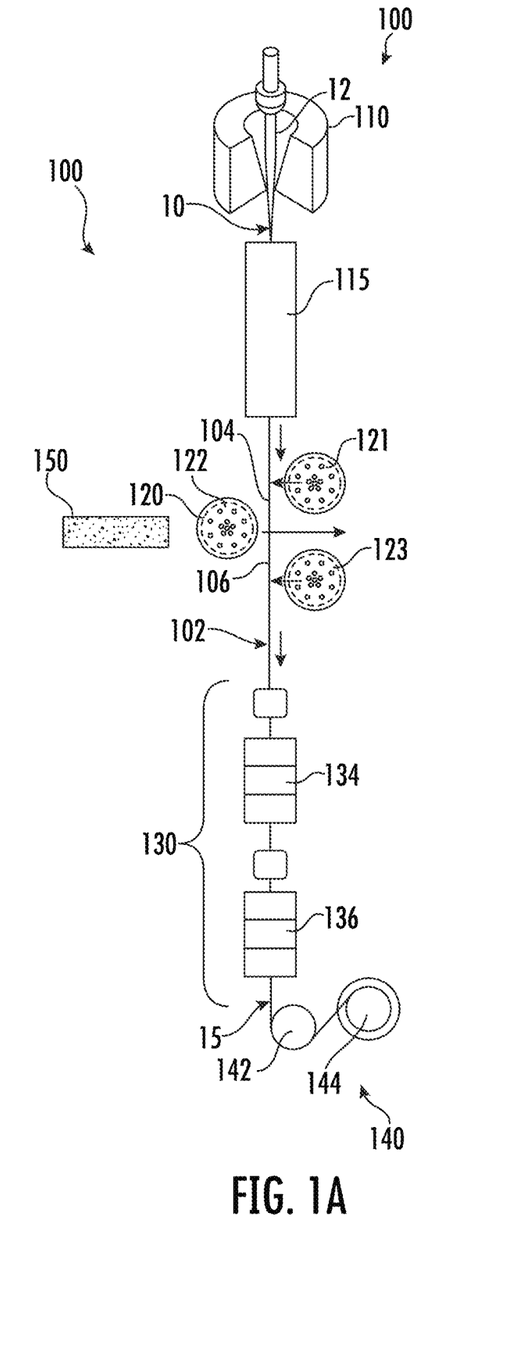
FIGS. 1A and 1B are a schematic illustrations of an optical fiber production system, according to one or more embodiments shown and described herein.
Figure 1B:
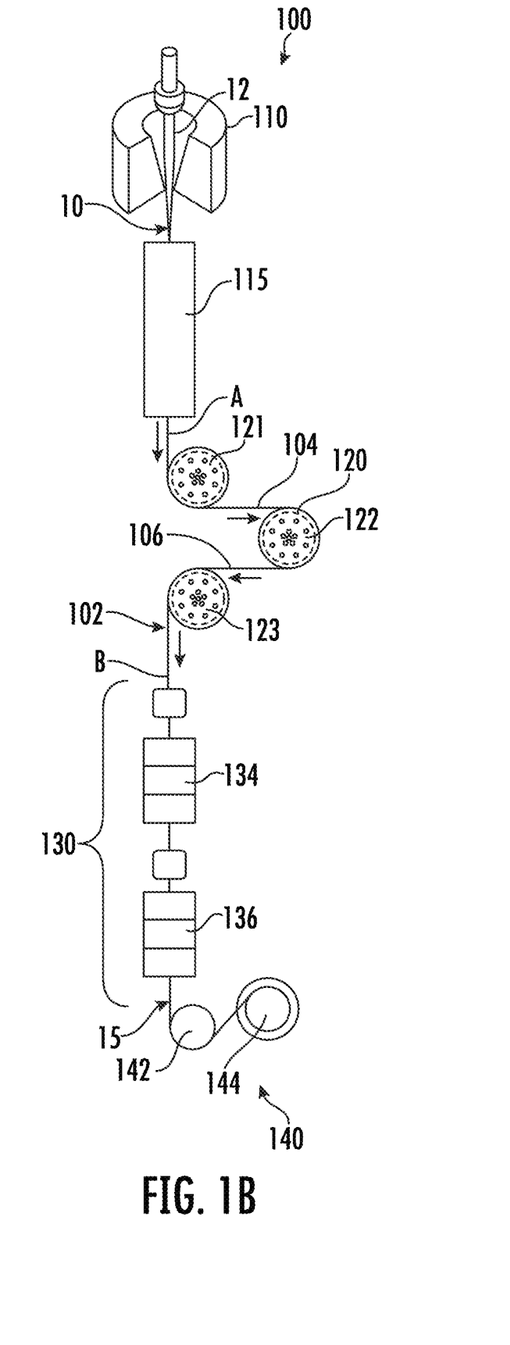

Referring now to FIGS. 1A and 1B, an optical fiber production system 100 configured to produce an optical fiber is schematically depicted. The optical fiber production system 100 comprises a draw furnace 110, a fiber cooling mechanism 115, one or more fluid bearings 120, a fiber coating unit 130, and a fiber collection unit 140. As depicted in FIGS. 1A and 1B, a draw pathway 102 extends from draw furnace 110 to fiber collection unit 140 and is the pathway along which an optical fiber 10 travels during production. The draw pathway 102 comprises one or more draw pathway portions, as discussed further below.

As depicted in FIGS. 1A and 1B, an optical fiber preform 12 is positioned in draw furnace 110 and optical fiber 10 is drawn therefrom. Prior to reaching fiber coating unit 130, optical fiber 10 is a bare optical fiber. Optical fiber preform 12 may be comprised of any glass or material suitable for the manufacture of optical fibers.

Optical fiber 10 is cooled as it passes through fiber cooling mechanism 115, which can be any mechanism known in the art for cooling optical fiber. For example, fiber cooling mechanism 115 may be filled with a gas that can facilitate cooling of optical fiber 10 at a rate faster or slower than cooling optical fiber 10 in ambient air. For example, fiber cooling mechanism 115 is a slow cooling device. In some embodiments, fiber cooling mechanism 115 uses air cooling tubes or helium jet cooling tubes to cool optical fiber 10. It is also contemplated in some embodiments that system 100 does not comprise fiber cooling mechanism 115.

Fiber coating unit 130 may apply one or more layers of coating(s) to optical fiber 10. As shown in FIGS. 1A and 1B, fiber coating unit 130 may comprise a primary coating unit 134 and a secondary coating unit 136. Primary coating unit 134 may apply a primary coating to optical fiber 10, and secondary coating unit 136 may apply a secondary coating to optical fiber 10. Primary coating unit 134 and/or secondary coating unit 136 may apply a protective polymeric-based coating to optical fiber 10, for example, an acrylate coating.

Fluid bearings 120 may be used to direct and transport optical fiber 10 as it is drawn along draw pathway 102. As discussed further below, fluid bearings 120 direct and transport optical fiber 10 through system 100 such that optical fiber 10 does not make mechanical contact with any surface until after a coating layer is applied to optical fiber 10 at fiber coating unit 130 (thereby forming a coated optical fiber 15). As shown in FIGS. 1A and 1B, in a first embodiment, system 100 comprises three fluid bearings: 121, 122, 123. However, it is also contemplated that more or less fluid bearings may be used.

Fluid bearings 120 may be disposed along draw pathway 102 between draw furnace 110 and fiber coating unit 130. Although FIGS. 1A and 1B show fluid bearings 120 as being disposed downstream of fiber cooling mechanism 115, it is also contemplated that one or more fluid bearings 120 may be disposed upstream of fiber cooling mechanism 115 along draw pathway 120.

In operation, optical fiber 10 is drawn from optical fiber preform 12, leaves draw furnace 110, travels along draw pathway 102 until it reaches fiber cooling mechanism 115, which cools optical fiber 10 before it is coated at fiber coating unit 130. Before optical fiber 10 reaches fiber coating unit 30, it is a bare optical fiber. After optical fiber 10 is coated at fiber coating unit 130 and becomes coated optical fiber 15, the fiber undergoes a variety of other processing stages (not shown) within system 100 before reaching fiber collection unit 140.

Fiber collection unit 140 includes one or more drawing mechanisms 142 used to apply tension to optical fiber 10, thereby providing the necessary tension on optical fiber 10 as it is drawn throughout system 100. Fiber collection unit 140 also includes a fiber storage spool 144 so that coated optical fiber 15 may be wound onto fiber storage spool 144.

FIG. 1A shows a first configuration of system 100 in which draw pathway 102 is in a vertical line that is straight (or substantially straight). This first configuration of system 100, as depicted in FIG. 1A, is shown after the drawing process of optical fiber 10 has started. Thus, FIG. 1A depicts a first configuration of system 100 during the drawing process.

During the drawing process, one or fluid bearings 120 may move from the first configuration of FIG. 1A to the second configuration of FIG. 1B. For example, first fluid bearing 121 may move from a first position, as shown in FIG. 1A, to a second position, as shown in FIG. 1B. In the embodiment of FIGS. 1A and 1B, first fluid bearing 121 moves to the left in order to move from its first position to its second position. As shown in FIG. 1A, the first position of first fluid bearing 121 is removed from draw pathway 102 such that the fluid bearing is not disposed along the pathway and does not engage with optical fiber 10. As shown in FIG. 1B, the second position of first fluid bearing 121 is disposed in draw pathway 102 such that the fluid bearing engages with optical fiber 10 as it is drawn along draw pathway 102. Thus, movement of first fluid bearing 121 from its first position to its second position causes at least a first portion 104 of draw pathway 102 to change direction.

As shown in FIG. 1A, when first fluid bearing 121 is in its first position, first portion 104 of draw pathway 102 moves in a first direction that is vertical (or substantially vertical). Movement of first fluid bearing 121 from its first position to its second position causes first portion 104 of draw pathway 102 to change direction from the first direction to a second direction. In the embodiment of FIGS. 1A and 1B, the second direction is horizontal (or substantially horizontal), therefore, the second direction is substantially perpendicular to the first direction.

Movement of first fluid bearing 121 from its first position to its second position causes first portion 104 of draw pathway 102 to change direction by approximately 90 degrees. However, it is also contemplated that movement of first fluid bearing 121 from the first position to the second position causes first portion 104 of draw pathway 102 to change direction by approximately 90 degrees or less, or about 60 degrees or less, or about 45 degrees or less, or about 30 degrees or less, or about 15 degrees or less, or about 10 degrees or less, or about 5 degrees or less, or about 90 degrees or greater, or about 100 degrees or greater, or about 120 degrees or greater.

As also shown in FIGS. 1A and 1B, second fluid bearing 122 and third fluid bearing 123 may each move from a first position to a second position. Similar to first fluid bearing 121, the first position of each of second and third fluid bearings 122, 123 may be removed from draw pathway 102, and the second position of each of second and third fluid bearings 122, 123 may be disposed in draw pathway 102. In the embodiment of FIGS. 1A and 1B, second fluid bearing 122 moves to the right in order to move from its first position to its second position, and third fluid bearing 123 moves to the left in order to move from its first position to its second position. Thus, movement of each of second and third fluid bearings 122, 123 from their first position to their second position causes at least a portion of draw pathway 102 to change direction.

For example, movement of second fluid bearing 122 from its first position to its second position causes a second portion 106 of draw pathway 102 to change direction from a first direction to a second direction. In the embodiments of FIGS. 1A and 1B, a first direction of second portion 106 of draw pathway 102 (when second fluid bearing 122 is in its first position) is vertical (or substantially vertical). Furthermore, a second direction of second portion 106 of draw pathway 102 (when second fluid bearing 122 is in its second position) is horizontal (or substantially horizontal). Thus, the second direction of second portion 106 is substantially perpendicular to the first direction of second portion 106.

It is also noted that the first directions of first portion 104 and of second portion 106 of draw pathway 102 are parallel (or substantially parallel) and are oriented in the same direction. However, in the configuration of FIG. 1B, the second direction of first portion 104 is opposite to the second direction of second portion 106. Furthermore, after movement of fluid bearings 121, 122, 123 from their first positions to their second positions, an outlet of draw pathway 102 from fiber cooling mechanism 115 (point A) is axially aligned with an inlet of draw pathway 102 into fiber coating unit 130 (point B), as shown in FIG. 1B.

First portion 104 and second portion 106 may be distinct and separate portions of draw pathway 102. However, it is also contemplated that first portion 104 and second portion 106 at least partially overlap in length along draw pathway 102.

Fluid bearings 120 in system 100 may all move simultaneously, or one or more fluid bearings may move after the movement of one or more other fluid bearings. For example, first and third fluid bearings 121, 123 may move to each of their second positions before movement of second fluid bearing 122 to its second position. In another embodiment, second fluid bearing 122 moves to its second position before movement of first and third fluid bearings 121, 123.

In some embodiments, movement of more than one fluid bearing 120 may be required in order to provide the change of direction of the portions of draw pathway 102. For example, movement of first, second, and third fluid bearing 121, 122, 123 from each of their first positions to their second positions may be required in order for first and second portions 104, 106 to move in a horizontal direction and for points A and B of draw pathway 102 to be axially aligned.

Fluid bearings 120 may each move from their first position to their second position after determining that the one or more process conditions are met. The process conditions may include, for example, a predetermined draw speed of optical fiber 10, a predetermined fiber diameter of optical fiber 10, a predetermined fiber tension of optical fiber 10, or a determination that system 100 is in an on position. Fluid bearings 20 may not move until one or more of the process conditions have been met during the drawing process of optical fiber 10. In some embodiments, the predetermined fiber diameter may be about +/−1 micron of a target fiber diameter. In one example the target fiber diameter is about 125 microns so that the predetermined fiber diameter is about 124 microns to about 126 microns. Furthermore, the predetermined fiber tension may about +/−50% of a target fiber tension.

As discussed above, the first configuration of system 100 (FIG. 1A) may occur after the drawing process has already started. Thus, fluid bearings 120 each move from their first position to their second position during the drawing operation of optical fiber 10. However, it is also contemplated that the first and second configurations of system 100 may both occur before the drawing process has started. Therefore, one or more fluid bearings 120 may move from their first position to their second position before the start of the drawing operation.

In some embodiments, fiber coating unit 130 may only coat optical fiber 10 with a coating after translation of one or more fluid bearings 120. For example, fiber coating unit 130 may not apply a coating to optical fiber 10 until first, second, and third fluid bearings 121, 122, 123 have all assumed their second positions.

Fluid bearings 120 may move from their first position to their second position using a translation mechanism 150, which may be capable of moving fluid bearings in any direction and/orientation prior to engagement of fluid bearings 120 with optical fiber 10. For example, translation mechanism 150 may move each fluid bearing 120 in a linear pathway, an arc-shaped pathway, an S-shaped pathway, a transverse pathway, or a slanting pathway relative to optical draw pathway 102. It is also contemplated that translation mechanism 150 moves one or more fluid bearings 120 in a combination of one or more of the above-disclosed pathways. However, it is noted that upon engagement of fluid bearings 120 with optical fiber 10, fluid bearings 120 should move in a direction sufficient to receive optical fiber 10 (e.g., in a direction such that an opening of a fluid bearing 120 is axially aligned with optical fiber 10). In some embodiments, translation mechanism 150 is a linear slide or an air drive slide.

Movement of fluid bearings 120 from their first position to their second position may be maintained in a single plane, such that fluid bearings 120 move, for example, forward and backward or up and down in a single plane. Additionally or alternatively, fluid bearings 120 may move in an arc in the single plane when moving from the first position to the second position. It is also noted that one or more fluid bearings 120 may move differently and with a different mechanism than one or more other fluid bearings 120.

FIG. 1B shows the configuration of system 100 after translation of fluid bearings 120 to their second positions. Due to the translation of fluid bearings 120, optical fiber 10 extends in a serpentine route along draw pathway 102. More specifically, optical fiber 10 extends in both vertical and non-vertical (e.g., horizontal) directions along draw pathway 102. Additionally or alternatively, optical fiber 10 may extend in transverse or diagonal directions along draw pathway 102.

Providing an optical fiber production system having one or more non-vertical pathway portions, such as shown in FIGS. 1A and 1B, has many advantages. For example, in conventional linear fiber production systems, adding new or additional components prior to a fiber coating unit, such as extra coating units or extra cooling mechanisms, requires that all such components be arranged vertically, often requiring an increase in height of the overall system. With the optical fiber production system 100 described herein, optical fiber 10 can be routed, for example, horizontally or diagonally (e.g., non-vertical) prior to a coating layer being applied at fiber coating unit 130. This provides more flexibility not only in set-up of the equipment, but for later modifications, additions, and updates within an existing production facility and without a need to increase overall system height.

Additionally, providing an optical fiber production system having one or more non-vertical pathways also increases the path length of draw pathway 102, thus increasing ambient cooling of optical fiber 10 before it enters fiber coating unit 130. Such may eliminate the need for fiber cooling mechanism 115, which saves manufacturing costs. Furthermore, as discussed further below, fluid bearings 120 themselves may provide additional cooling to optical fiber 10 as it is drawn along pathway 102. The additional cooling from fluid bearings 120 may provide significantly higher cooling rates during the drawing process than in traditional systems. Such may allow system 100 to run faster than traditional systems, while still maintaining an acceptable temperature of optical fiber 10 before it enters fiber coating unit 130. The additional cooling provided by system 100 may also allow for the use of lower cost polymeric coatings and higher coating speeds in fiber coating unit 130.

Figure 2A:
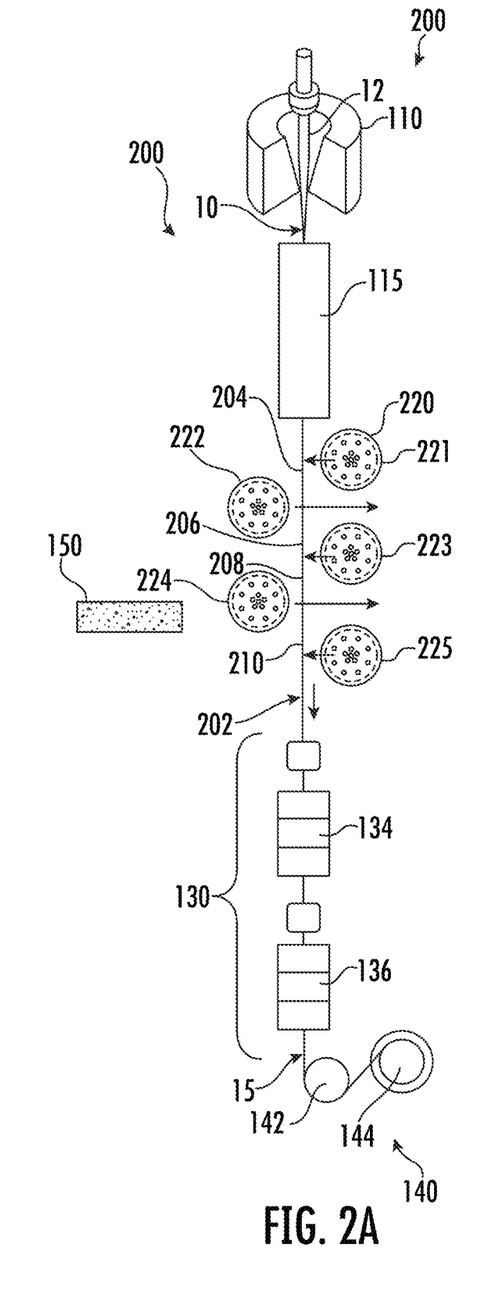
FIGS. 2A and 2B are schematic illustrations of an optical fiber production system, according to one or more embodiments shown and described herein.
Figure 2B:
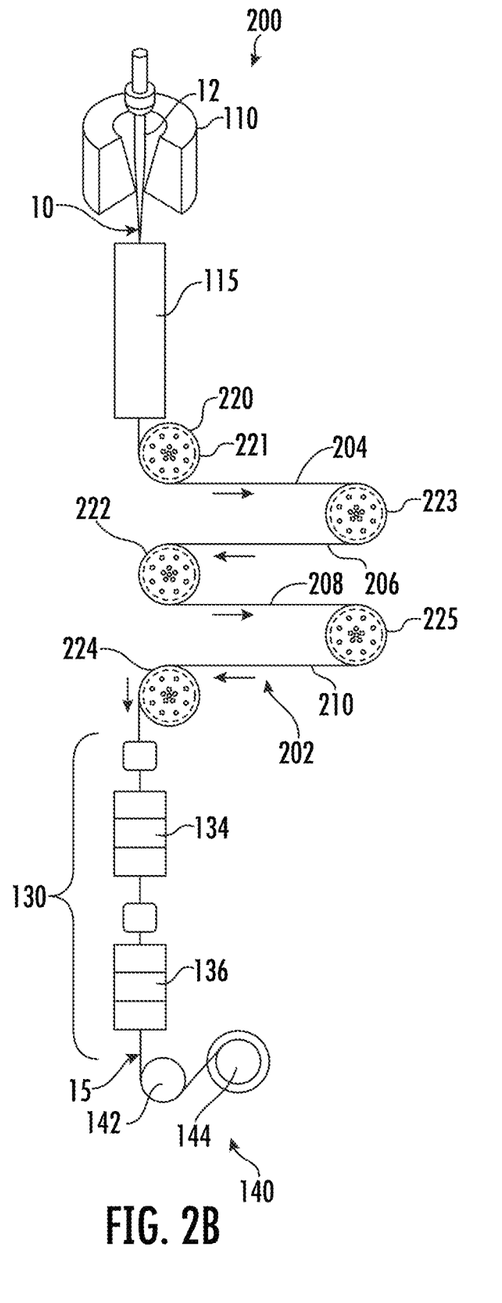

FIGS. 2A and 2B show an optical fiber production system 200 configured to produce an optical fiber. Similar to the embodiments of FIGS. 1A and 1B, system 200 comprises draw furnace 110, fiber cooling mechanism 115, fiber coating unit 130, and fiber collection unit 140. As depicted in FIGS. 2A and 2B, draw pathway 202 extends from draw furnace 110 to fiber collection unit 140 and is the pathway along which optical fiber 10 travels during production.

System 200 further comprises fluid bearings 220 to direct and transport optical fiber 10 as it is drawn along draw pathway 202. In the embodiment of FIGS. 2A and 2B, system 200 comprises five fluid bearings 221, 222, 223, 224, 225.

Similar to the embodiment of FIGS. 1A and 1B, fluid bearings 221, 222, 223, 224, 225 each move from a first position to a second position, which causes one or more portions of draw pathway 202 to change direction. For example, movement of one or more fluid bearings 221, 222, 223, 224, 225 causes first portion 204, second portion 206, third portion 208, and fourth portion 210 of draw pathway 202 to each change from a first direction to a second direction. First fluid bearing 221, third fluid bearing 223, and fifth fluid bearing each move to the left in order to move from their first position to their second position. Second fluid bearing 222 and fourth fluid bearing 224 each move to the right in order to move from their first position to their second position.

As shown in FIG. 2A, the first positions of fluid bearings 221, 222, 223, 224, 225 are removed from draw pathway 202 such that the fluid bearings are not disposed along the pathway and do not engage with optical fiber 10. As shown in FIG. 2B, the second positions of fluid bearings 221, 222, 223, 224, 225 are disposed in draw pathway 202 such that the fluid bearings engage with optical fiber 10 as it is drawn along draw pathway 202.

Figure 3A:
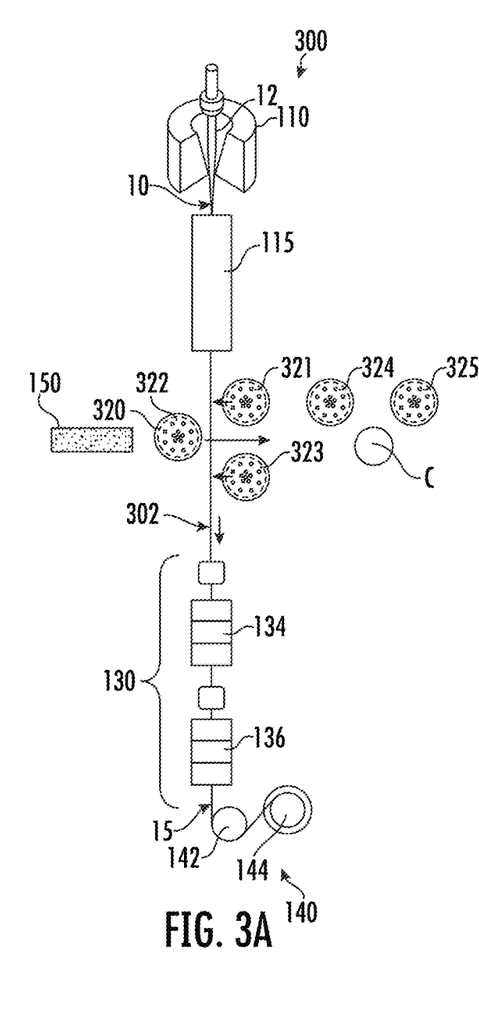

FIGS. 3A-3C show an optical fiber production system 300 configured to produce an optical fiber. Similar to the embodiments of FIGS. 1A and 1B, system 300 comprises draw furnace 110, fiber cooling mechanism 115, fiber coating unit 130, and fiber collection unit 140. As depicted in FIGS. 3A-3C, draw pathway 302 extends from draw furnace 110 to fiber collection unit 140 and is the pathway along which optical fiber 10 travels during production.

System 300 further comprises fluid bearings 320 to direct and transport optical fiber 10 as it is drawn along draw pathway 302. In the embodiment of FIGS. 3A-3C, system 300 comprises six fluid bearings 321, 322, 323, 324, 325, 326.

Similar to the embodiment of FIGS. 1A and 1B, fluid bearings 321, 322, 323, 324, 325, 326 each move from a first position to a second position, which causes one or more portions of draw pathway 202 to change direction. However, in the embodiment of FIGS. 3A-3C the fluid bearings move in stages such that a first set of fluid bearings move in a first stage, a second set of fluid bearings move in a second stage, and a third set of fluid bearings move in a third stage. For example, as shown in FIGS. 3A and 3B, first, second, and third fluid bearings 321, 322, 323 each move from their first position to their second position during the first stage. First fluid bearing 321 and third fluid bearing 323 each move to the left in order to move from their first position to their second position. Second fluid bearing 322 moves to the right to move from its first position to its second position. As shown in FIG. 3B, the second position of second fluid bearing 322 may be positioned to the right of the first position of fifth fluid bearing 325.

Next, during a second stage, sixth fluid bearing 326 may move from a position remote from system 300 to its first position. As shown in FIGS. 3A and 3B, the first position of sixth fluid bearing 326 may be position C.

After translation of sixth fluid bearing 326 to its first position, fourth, fifth and sixth fluid bearings 124, 125, 126 may each move from their first position to their second position during a third stage. As shown in FIGS. 3B and 3C, fourth fluid bearing 324 and fifth fluid bearing 325 each move downward in order to move from their first position to their second position. Sixth fluid bearing 326 moves upward in order to move from its first position to its second position. As shown in FIG. 3C, the second position of sixth fluid bearing 326 may be positioned higher than first, fourth, and fifth fluid bearings 321, 324, 325.

It is noted that the first, second, and third stages may occur in any order and each stage may occur after a previous stage has finished, or the various stages may overlap in time (partially or fully).

Figure 3B:
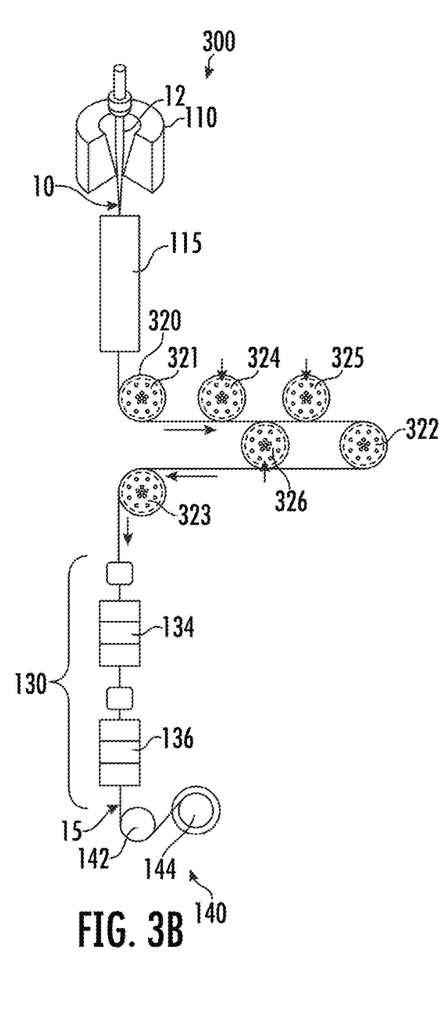
Figure 3C:
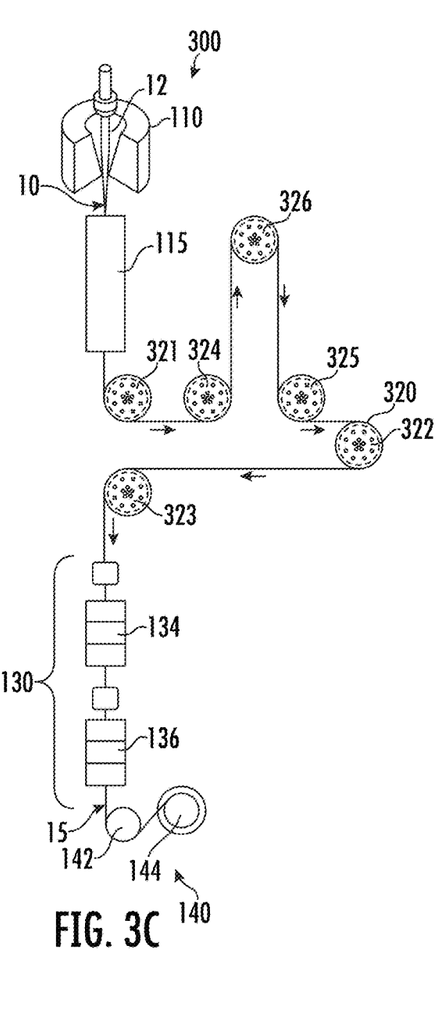

As shown in FIGS. 3A-3C, the first positions of fluid bearings 321, 322, 323, 324, 325, 326 are removed from draw pathway 302 such that the fluid bearings are not disposed along the pathway and do not engage with optical fiber 10. Furthermore, the second positions of fluid bearings 321, 322, 323, 324, 325, 326 are disposed in draw pathway 302 such that the fluid bearings engage with optical fiber 10 as it is drawn along draw pathway 302.

It is also contemplated, in the various embodiments disclosed herein, that one or more fluid bearings may move to a third position after moving to their second position. For example, after movement of sixth fluid bearing 326 to its second position, as shown in FIG. 3C, sixth fluid bearing 326 may move to a third position that is positioned to the left or right of its second position. As another example, after movement of third fluid bearing 323 to its second position, as shown in FIGS. 3B and 3C, third fluid bearing 323 may move to a third position so that optical fiber 10 is axially aligned with the inlet of fiber coating unit 130.

Figure 4A:
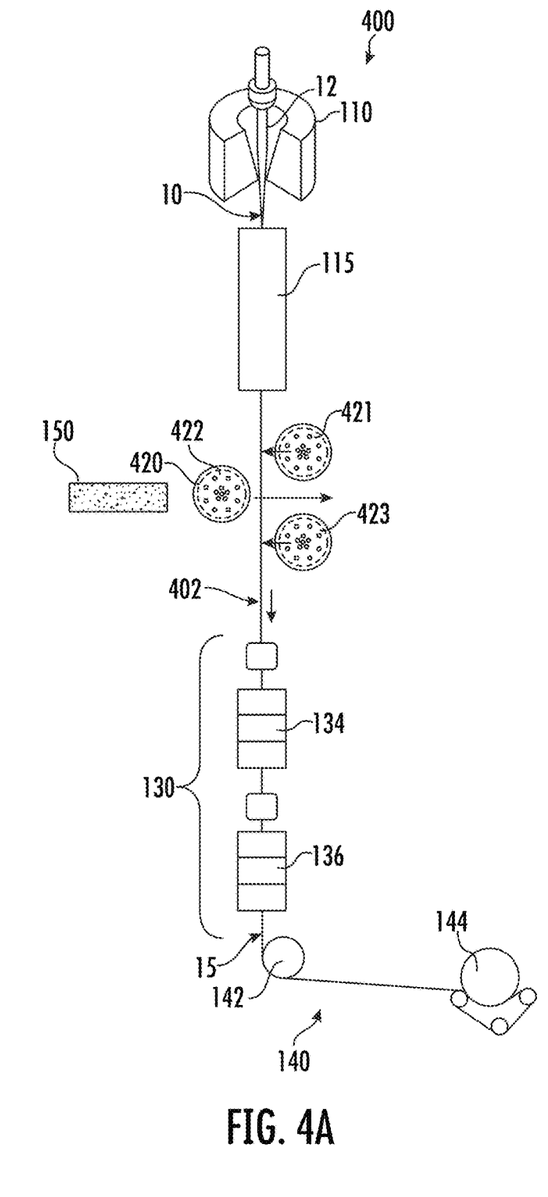

In the embodiments disclosed herein, furnace 110, fiber cooling mechanism 115, fiber coating unit 130, and/or fiber collection unit 140 may also translate from a first position to a second position. Movement of these components may occur before, after, or simultaneously with the movement of the fluid bearings. For example, fiber cooling mechanism 115 may translate to a second position so that it is optimally disposed for cooling of optical fiber 10. As another example, fiber coating unit 130 may translate to a second position so that it is axially aligned with draw pathway 102. Examples of these embodiments are discussed further with reference to FIGS. 4A-4D.

FIGS. 4A-4D show an optical fiber production system 400 configured to produce an optical fiber. Similar to the embodiments of FIGS. 1A and 1B, system 400 comprises draw furnace 110, fiber cooling mechanism 115, fiber coating unit 130, and fiber collection unit 140. As depicted in FIGS. 4A-4D, draw pathway 402 extends from draw furnace 110 to fiber collection unit 140 and is the pathway along which optical fiber 10 travels during production.

System 400 further comprises fluid bearings 420 to direct and transport optical fiber 10 as it is drawn along draw pathway 402. In the embodiment of FIGS. 4A-4D, system 400 comprises four fluid bearings 421, 422, 423, 424.

Similar to the embodiment of FIGS. 1A and 1B, fluid bearings 421, 422, 423, 424, each move from a first position to a second position, which causes one or more portions of draw pathway 402 to change direction. However, in the embodiment of FIGS. 4A-4D the fluid bearings move in stages such that a first set of fluid bearings move in a first stage, a second set of fluid bearings move in a second stage, a third set of fluid bearings move in a third stage, and a fourth set of fluid bearing moves in a fourth stage. Additionally, fiber coating unit 130 and fiber cooling mechanism 115 each translates from a first position to a second position during the various stage.

Figure 4B:
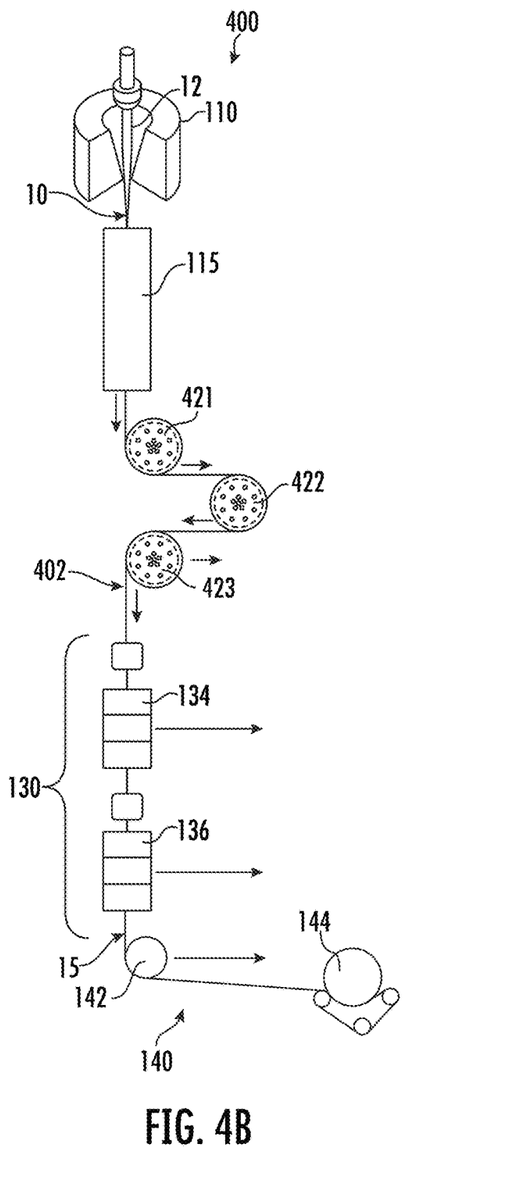

For example, as shown in FIGS. 4A and 4B, first, second, and third fluid bearings 421, 422, 423 each move from their first position to their second position during the first stage. First fluid bearing 421 and third fluid bearing 423 each move to the left in order to move from their first position to their second position. Second fluid bearing 422 moves to the right to move from its first position to its second position.

Figure 4C:
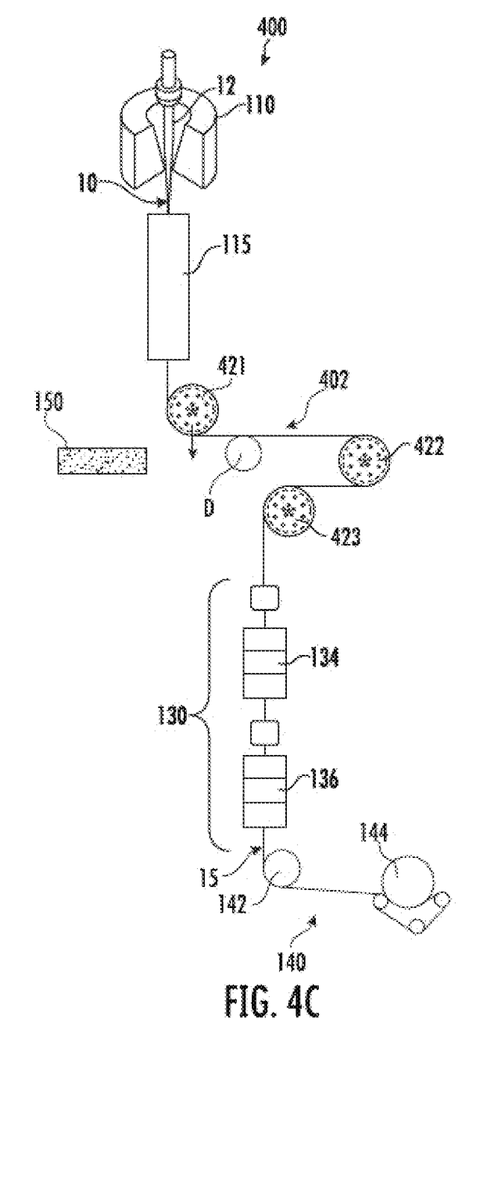

Next, during a second stage, fiber coating unit 130 translates from a first position, as shown in FIG. 4B, to a second position, as shown in FIG. 4C. Fiber coating unit 130 moves to the right in order to move from its first position to its second position. By moving to its second position, fiber coating unit 130 is no longer axially aligned with fiber cooling mechanism 115. During this second stage, one or more components of fiber collection unit 140 may also translate with fiber coating unit 130. Additionally, during this second stage, third fluid bearing 423 moves from its second position to a third position. As shown in FIGS. 4B and 4C, third fluid bearing 423 moves to the right (relatively closer to second fluid bearing 422) in order to move from its second position to its third position.

Figure 4D:
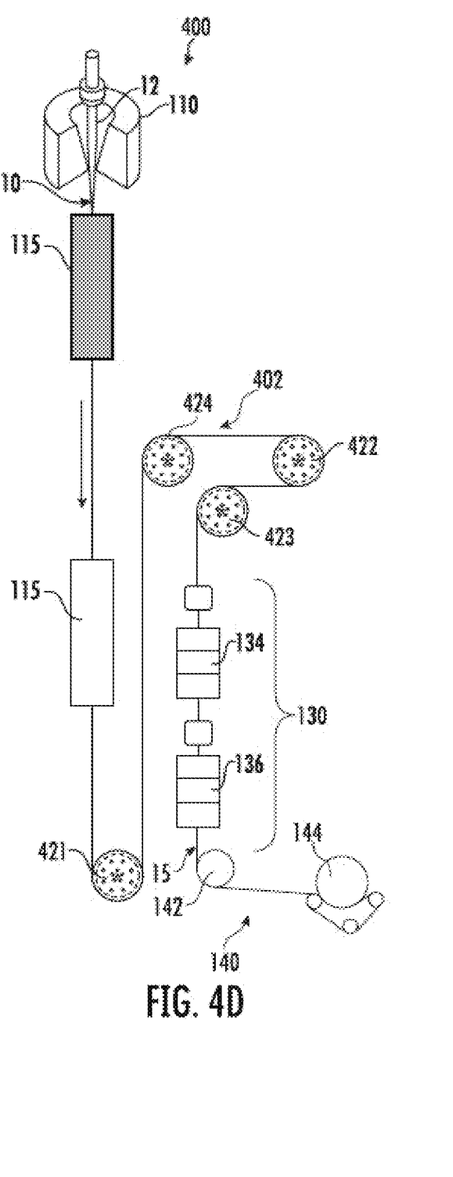

After translation of fiber coating unit 130 and during a third stage, fourth fluid bearing unit 424 may move from a position remote from system 400 to its first position. As shown in FIGS. 4C and 4D, the first position of fourth fluid bearing 424 may be position D.

During a fourth stage, first fluid bearing 421 moves from its second position to a third position, as shown in FIG. 4D. First fluid bearing 421 moves downward in order to move from its second position to its third position. In the embodiment of FIGS. 4A-4D, movement of first fluid bearing 421 to its third position causes fiber cooling mechanism 115 to also move from a first position, as shown in FIG. 4C, to a second position, as shown in FIG. 4D. Fiber cooling mechanism 115 moves downward in order to move from its first position to its second position. As shown in FIG. 4D, the third position of first fluid bearing 421 may be axially aligned with fiber collection unit 140.

System 400 may advantageously allow optical fiber 10 to cool via ambient air before entering fiber cooling mechanism 115. Such allows system 400 to operate at high draw speeds while reducing the temperature at which optical fiber 10 enters fiber cooling mechanism 115.

It is noted that the first, second, third, and fourth stages may occur in any order and each stage may occur after a previous stage has finished, or the various stages may overlap in time (partially or fully).

As shown in FIGS. 4A-4D, the first positions of fluid bearings 421, 422, 423, 424 are removed from draw pathway 402 such that the fluid bearings are not disposed along the pathway and do not engage with optical fiber 10. Furthermore, the second positions of fluid bearings 421, 422, 423, 424 are disposed in draw pathway 402 such that the fluid bearings engage with optical fiber 10 as it is drawn along draw pathway 402.

Figures 5A, 5B:
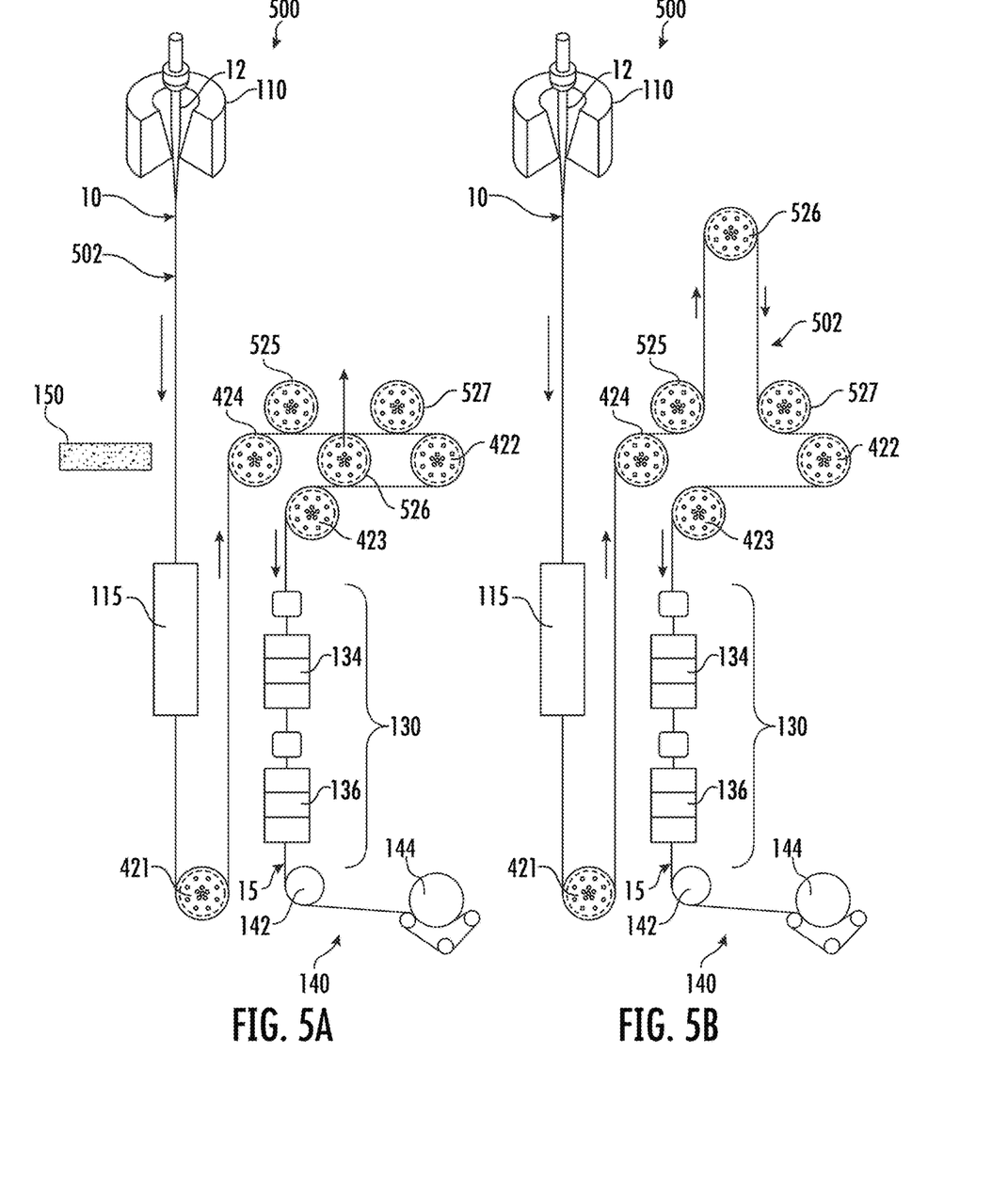
FIGS. 5A and 5B are schematic illustrations of an optical fiber production system, according to one or more embodiments shown and described herein.

FIGS. 5A and 5B show an optical fiber production system 500 that is similar to system 400, but with the inclusion of additional fluid bearings. System 500 is configured to produce an optical fiber and, similar to the embodiments of FIGS. 1A and 1B, system 500 comprises draw furnace 110, fiber cooling mechanism 115, fiber coating unit 130, and fiber collection unit 140. As depicted in FIGS. 5A and 5B, draw pathway 502 extends from draw furnace 110 to fiber collection unit 140 and is the pathway along which optical fiber 10 travels during production.

System 500 comprises fluid bearings 421, 422, 423, 424, as discussed above with reference to FIGS. 4A-4D. Additionally, system 500 further comprises fifth fluid bearing 525, sixth fluid bearing 526, and seventh fluid bearing 527 to direct and transport optical fiber 10 as it is drawn along draw pathway 502. After the system has assumed the configuration of FIG. 4D, fluid bearings 525, 526, 527 may each move from a position remote from the system to their first positions. FIG. 5A shows fluid bearings 525, 526, 527 each in their first positions.

Next, fluid bearings 525, 5266, 527 each move from their first position to their second position, as shown in FIGS. 5A and 5B. Fifth fluid bearing 525 and seventh fluid bearing 527 each move downward in order to move from their first position to their second position. Sixth fluid bearing 526 moves upward to move from its first position to its second position.

Movement of fluid bearings 525, 526, 527 to their second positions advantageously provides additional cooling of optical fiber 10 via ambient air before entering fiber coating unit 130. Such allows system 500 to operate at high draw speeds while reducing the temperature at which optical fiber 10 enters fiber coating unit 130.

As shown in FIGS. 5A and 5B, the first positions of fluid bearings 525, 526, 527 are removed from draw pathway 502 such that the fluid bearings are not disposed along the pathway and do not engage with optical fiber 10. Furthermore, the second positions of fluid bearings 525, 526, 527 are disposed in draw pathway 502 such that the fluid bearings engage with optical fiber 10 as it is drawn along draw pathway 502.

Although FIGS. 1A-5B show the fluid bearings as being disposed in a single plane, it is also contemplated that one or more fluid bearings may be disposed in a different plane from one or more other fluid bearings. For example, with reference to the embodiment of FIGS. 1A and 1B, first and third fluid bearings 121, 123 may be disposed in a different plane (e.g., in front of or behind) second fluid bearing 122 when the fluid bearings are in their first positions. Movement of the fluid bearings from their first positions to their second positions may cause the fluid bearings to all be aligned in the same plane, when the fluid bearings are each in their second position. In another embodiment, for example, first and second fluid bearings 121, 122 may be disposed in a different plane (e.g., in front of or behind) third fluid bearing 123 when the fluid bearings are in their second positions.

As discussed above, the fluid bearings disclosed herein transport the bare optical fiber 10 through the optical fiber production system such that optical fiber 10 does not make mechanical contact with any surface until after the coating layer is applied to optical fiber 10 (thereby forming coated optical fiber 15). In operation, the fluid bearings provide a region of fluid over which the bare optical fiber 10 can travel without making mechanical contact with the fluid bearings, for example, with a fluid that is nonreactive relative to the bare optical fiber 10 (e.g., air, helium). As used herein, mechanical contact refers to contact with a solid component in the draw process. This lack of mechanical contact can be important to maintain the quality and integrity of the fragile bare optical fiber, especially one which travels through a non-vertical path prior to being coated by fiber coating unit 130. It is noted that the mechanical contact provided by fiber collection unit 140 is acceptable because when the optical fiber reaches fiber collection unit 140, the optical fiber has been coated with a coating layer that protects the fiber, and as such, mechanical contact with the coated surface does not substantially affect the quality or integrity of the fiber in the same way as if the fiber was uncoated. However, it should be understood that while the fluid bearings are primarily described herein as facilitating travel of the bare optical fiber 10 along draw pathway 102, 202, 302, 402, 502, the fluid bearings may be used with any optical fiber, such as coated optical fiber 15.

In some embodiments, while providing a region of fluid cushion over which optical fiber 10 can travel, the fluid bearings may also cool optical fiber 10. For example, in embodiments without fiber cooling mechanism 115, the fluid bearings may perform the cooling functionality of fiber cooling mechanism 115. In particular, because the fluid bearings employ a moving fluid stream that supports optical fiber 10, the optical fiber is cooled at a rate that is faster than the optical fiber would cool in ambient non-moving air. The greater the temperature difference between optical fiber 10 and the fluid in the fluid bearings, the greater the ability of the fluid bearings to cool optical fiber 10. It is also noted that the cooling of the fluid bearings may be used in conjunction with fiber cooling mechanism 115.

Figure 6:
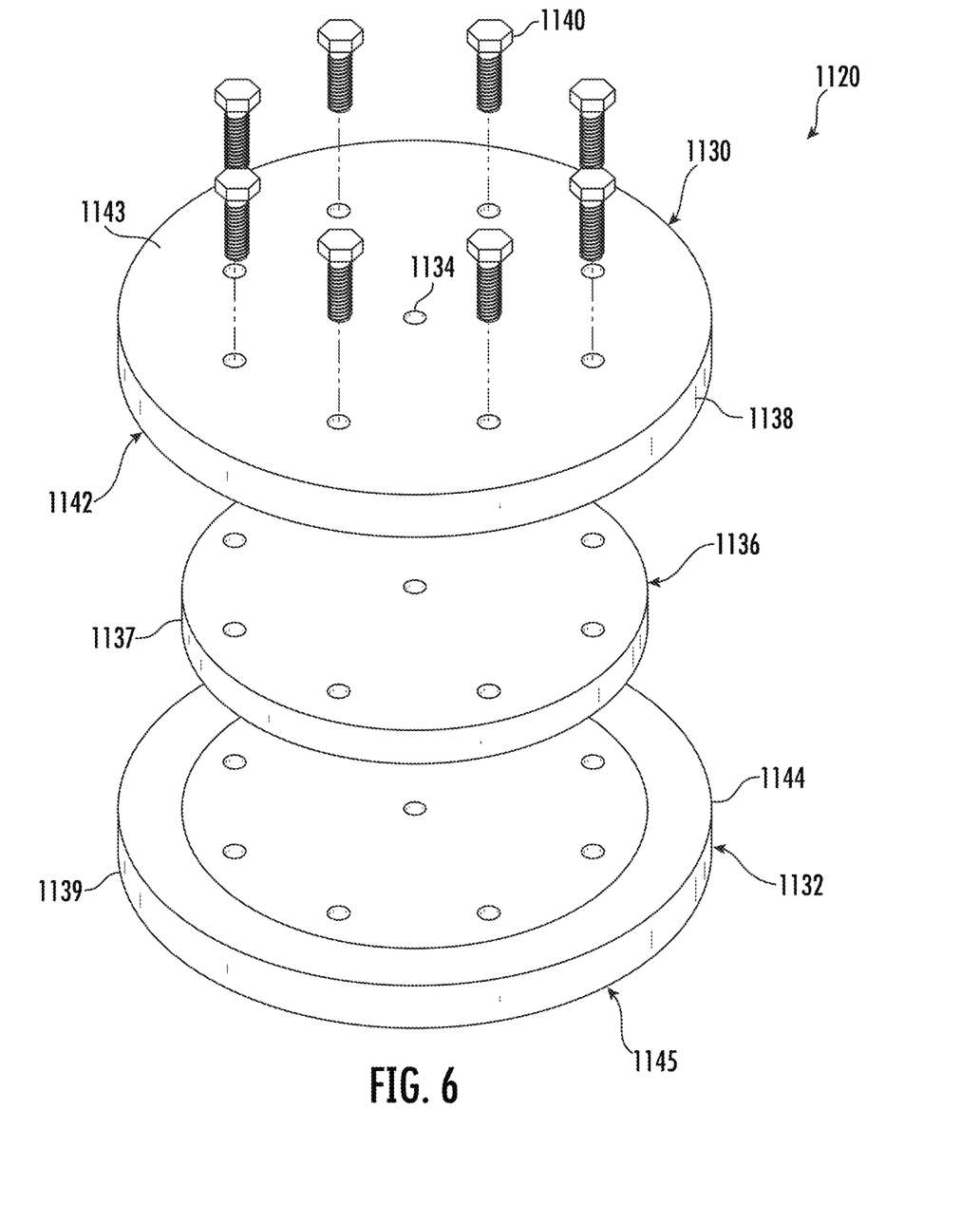
FIG. 6 is an exploded view of a fluid bearing for use in an optical fiber production system, according to one or more embodiments shown and described herein.

FIG. 6 depicts a detailed view of a fluid bearing 1120 according to embodiments of the present disclosure. Fluid bearing 1120 includes a first plate 1130, a second plate 1132, an inner member 1136, and at least one opening 1134 in at least one of first and second plates 1130, 1132. First plate 1130 and second plate 1132 each include an arcuate outer surface 1138, 1139 and are positioned on opposite sides of each other. Arcuate outer surfaces 1138, 1139 lie along the circumference of each of the respective plates 1130, 1132 and are substantially aligned with one another. Further, first plate 1130 and second plate 1132 are connected by fasteners (e.g., bolts 1140) to link first and second plates 1130, 1132 together so that fluid may be passed through fluid bearing 1120.

Figure 7:
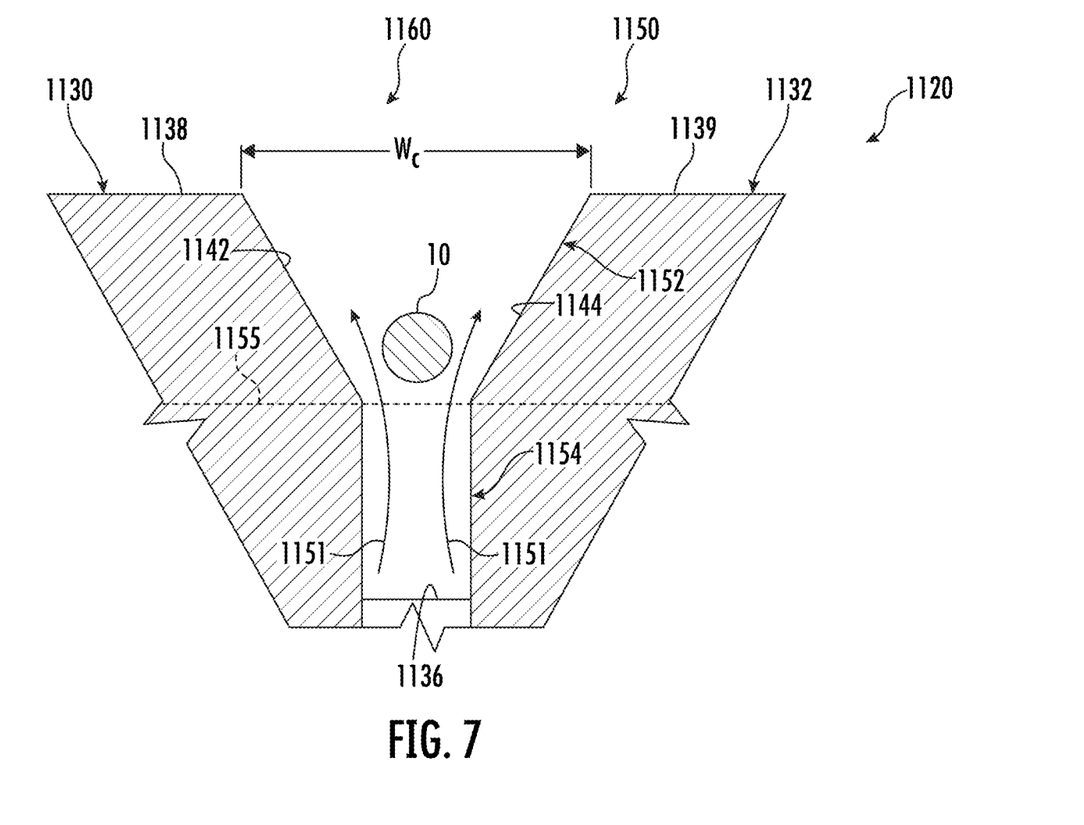
FIG. 7 is a partial side plan view of the fluid bearing of FIG. 6, according to one or more embodiments shown and described herein.

First plate 1130 and second plate 1132 each have respective inner faces 1142, 1144 and outer faces 1143, 1145. Inner face 1142 of first plate 1130 faces inner face 1144 of second plate 132 to form a fiber support channel 1150 (as shown in FIG. 7) between inner faces 1142, 1144 and extending radially inward from arcuate outer surfaces 1138, 1139 of each plate 1130, 1132. Fiber support channel 1150 provides a plenum for fluid flow and is configured to receive optical fiber 10 (or any other optical fiber) so that optical fiber 10 can travel along fiber support channel 1150 without rotation of fluid bearing 1120 and without mechanical contact between optical fiber 10 and fluid bearing 1120.

As shown in FIG. 6, inner member 1136 is positioned between first plate 1130 and second plate 1132. Inner member 136 (e.g., a shim 1137) is configured to aid in directing fluid from the at least one opening 1134 into fiber support channel 1150 such that the fluid exits fiber support channel 1150 having a predetermined flow direction. Inner member 1136 is disposed between first plate 1130 and second plate 1132 to provide a gap therebetween. In some embodiments, inner member 1136 may comprise a plurality of fingers (not shown) to further control fluid flow by suppressing non-radial flow. In addition, inner member 1136 serves as a sealing portion to provide substantial contact between first plate 1130 and second plate 1132.

Referring now to FIG. 7, fiber support channel 1150 is depicted in more detail. As shown in FIG. 7, fiber support channel 1150 comprises a fiber slot 1152 and a fluid slot 1154. Fiber slot 1152 extends radially inward from arcuate outer surfaces 1138, 1139 of plates 1130, 1132 (e.g., from an opening 1160 between arcuate outer surfaces 1138, 1139 of first plate 1130 and second plate 1132) and terminates at a fiber support channel boundary 1155. The radial inward direction is also referred to herein as the depth direction, where depth refers to the position of an optical fiber in the fiber support channel.

Fluid slot 1154 extends radially inward from fiber support channel boundary 1155 and terminates at inner member 1136. In operation, fluid may flow radially outward from inner member 1136 through fluid slot 1154 and fiber slot 1152 to provide a fluid cushion for optical fiber 10 disposed within fiber slot 1152 such that optical fiber 10 may be directed along draw pathway 102 (FIGS. 1A and 1B) without making mechanical contact with fluid bearing 1120.

Fiber support channel 1150 extends between inner face 1142 of first plate 1130 and inner face 1144 of second plate 1132, which are spaced apart by a channel width $W_C$. In the embodiment depicted in FIG. 7, fiber support channel 1150 is tapered, such that the channel width $W_C$ at opening 1160 is greater than the channel width $W_C$ at fiber support channel boundary 1155 and the channel width $W_C$ of fiber support channel 1150 is radially variable (e.g., variable depending on where optical fiber 10 is vertically positioned within fiber support channel 1150).

Further, FIG. 7 depicts optical fiber 10 disposed within fiber slot 1152 of fiber support channel 1150 and depicts a fluid 1151 (e.g., air) that flows from fluid slot 1154 (e.g., fluid flow originating from the at least one opening 1134 in first and/or second plates 1130, 1132) through fiber slot 1152, which contacts optical fiber 10 as it is transported across fluid bearing 1120. This fluid flow results in a positive pressure below optical fiber 10 that acts on and supports the bottom of optical fiber 10 by providing an upward (radially outward) force, thereby levitating optical fiber 10 to prevent substantial mechanical contact between optical fiber 10 and fluid bearing 1120. The pressure can be optimized so that optical fiber 10 is positioned and vertically maintained within fiber slot 1152 of fiber support channel 1150 such that optical fiber 10 is maintained between fiber support channel boundary 1155 and opening 1160 of fiber support channel 1150. For example, fluid 1151 traversing fiber support channel 1150 can have a constant fluid flow rate that can maintain or support optical fiber 10 within fiber slot 1152 as optical fiber 10 moves through fluid bearing 1120.

In some embodiments, the portions of inner faces 1142, 1144 within fiber slot 1152 of fiber support channel 1150 may be tapered or inclined such that fiber slot 1152 comprises a narrower channel width $W_C$ at the fiber support channel boundary 1155 (i.e., inside the arcuate path formed by optical fiber 10 as it passes through fluid bearing 1120) than at opening 1160 of fiber support channel 1150. In some embodiments, inner faces 1142 and 1144 are each inclined, for example, at an angle greater than 0 and less than 10°, such as from about 0.3° to about 7°, from about 0.4° to about 3°, or the like. Further, fiber support channel 1150 and fiber slot 1152 may comprise any depth and any channel width $W_C$. In different embodiments, the depth of fiber slot 1152 is greater than 0.25 inch, or greater than 0.40 inch, or greater than 0.55 inch, or greater than 0.70 inch or greater than 0.85 inch, or in the range from 0.25 inch to 1.25 inch, or in the range from 0.35 inch to 1.05 inch, or in the range from 0.45 inch to 0.90 inch, or in the range from 0.55 inch to 0.85 inch, or in the range from 0.60 inch to 0.80 inch, or about 0.65 inch, or about 0.75 inch. By utilizing a fiber support channel 1150 that is tapered (as shown, for example, in FIG. 7) and injecting fluid 1151 into fiber support channel 1150 so that the fluid enters the narrower inner portion of fiber support channel 1150 and exits the wider outer region of fiber support channel 1150, the cushion of fluid 1151 emitted through fiber support channel 1150 will cause optical fiber 10 to be self-locating within the depth of fiber support channel 1150.

Figure 8:
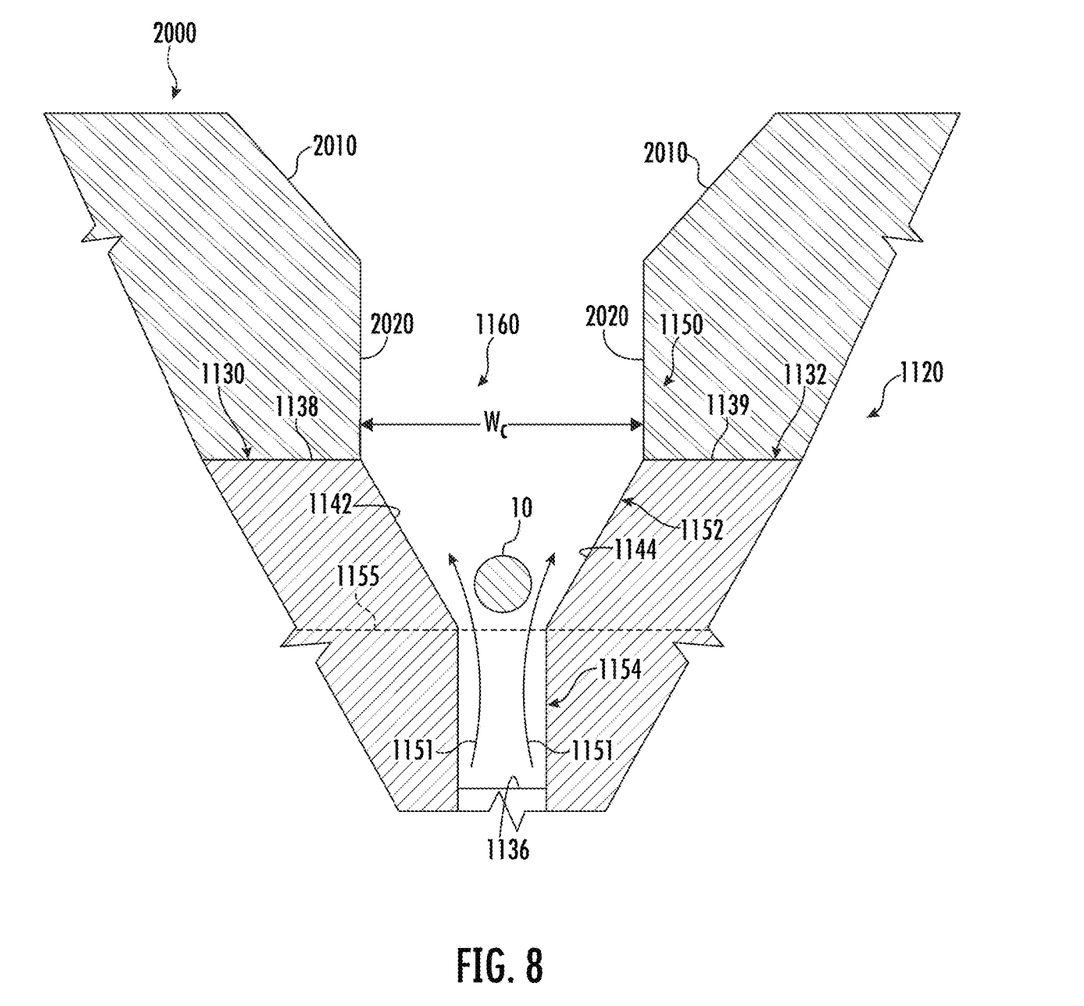
FIG. 8 is another partial side plan view of the fluid bearing of FIG. 6 with a guide slot attached thereto, according to one or more embodiments shown and described herein.

In some embodiments, the fluid bearings disclosed herein comprise a guide slot 2000 to aid in alignment of optical fiber 10 within fiber support channel 1150. As shown in FIG. 8, guide slot 2000 is disposed outwardly of fluid bearing 1120 and comprises inclined surfaces 2010 and vertical surfaces 2020 that aid in moving and centering optical fiber 10 within channel 1150. Inclined surfaces 2010 may be oriented at a variety of angles relative to vertical surfaces 2020, such as about 100 degrees, or about 120 degrees, or about 160 degrees. Additionally, guide slot 2000 may be attached to fluid bearing 1120 through any known attachment means such as, for example, a clip, screw, fastener, or adhesive. Guide slot 2000 may be removed from fluid bearing 1120 after optical fiber 10 is properly disposed with fluid bearing 1120.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of manufacturing an optical fiber, the method comprising:

drawing a bare optical fiber from an optical fiber preform along a draw pathway;

during the drawing step, moving a first fluid bearing from a first position of the first fluid bearing to a second position of the first fluid bearing, the first position of the first fluid bearing being removed from the draw pathway and the second position of the first fluid bearing being disposed in the draw pathway such that the movement of the first fluid bearing to the second position of the first fluid bearing causes at least a first portion of the draw pathway to change direction; and during the drawing step, moving a second fluid bearing from a first position of the second fluid bearing to a second position of the second fluid bearing, the first position of the second fluid bearing being removed from the draw pathway and the second position of the second fluid bearing being disposed in the draw pathway such that the movement of the second fluid bearing to the second position of the second fluid bearing causes at least a second portion of the draw pathway to change direction, wherein the second fluid bearing is moved to the second position of the second fluid bearing after the first fluid bearing moves to the second position of the first fluid bearing.

2. The method of claim 1, further comprising coating the bare optical fiber with a coating layer after moving the first fluid bearing to the second position od the first fluid bearing.

3. The method of claim 1, further comprising:
determining that one or more process conditions are met; and
moving the first fluid bearing from the first position of the first fluid bearing to the second position of the first fluid bearing after determining that the one or more process conditions are met.

4. The method of claim 3, wherein the one or more process conditions comprise a minimum draw speed, a predetermined fiber diameter, a predetermined fiber tension, or a determination that a coating system is in an on position.

5. The method of claim 1, further comprising moving the first fluid bearing from the first position of the first fluid bearing to the second position of the first fluid bearing in at least one of a linear pathway, an arc-shaped pathway, an S-shaped pathway, a transverse pathway, or a slanting pathway relative to the draw pathway.

6. The method of claim 1, wherein movement of the first fluid bearing to the second position of the first fluid bearing causes at least the first portion of the draw pathway to change direction from a first direction to a second direction, the second direction being substantially perpendicular to the first direction.

7. The method of claim 1, wherein at least part of the first portion of the draw pathway and a part of the second portion of the draw pathway overlap in length.

8. The method of claim 1, wherein movement of the second fluid bearing to the second position of the second fluid bearing causes at least the second portion of the draw pathway to change direction from a first direction of the second portion to a second direction of the second portion, the first direction of the second portion being substantially perpendicular to the second direction of the second portion.

9. The method of claim 1, wherein after movement of the first fluid bearing to the second position of the first fluid bearing and after movement of the second fluid bearing to the second position of the second fluid bearing, the first portion of the draw pathway is substantially parallel to the second portion of the draw pathway.

10. The method of claim 9, wherein a direction of the draw pathway in the first portion is opposite to a direction of the draw pathway in the second portion.

11. The method of claim 1, further comprising, after moving the first fluid bearing to the second position of the first fluid bearing, moving the first fluid bearing to a third position.

12. The method of claim 1, further comprising moving at least one of a fiber cooling mechanism, a fiber coating unit, and a fiber collection unit from a first position to a second position.

13. The method of claim 1, wherein, after movement of the first fluid bearing to the second position of the first fluid bearing, the draw pathway extends in a serpentine shape.

14. The method of claim 1, further comprising cooling the optical fiber with a fiber cooling mechanism.

15. The method of claim 1, further comprising cooling the optical fiber with the first fluid bearing.

* * * * *

UNITED STATES PATENT AND TRADEMARK OFFICE
CERTIFICATE OF CORRECTION

| | | |
|---|---|---|
| PATENT NO. | : 11,840,473 B2 | Page 1 of 1 |
| APPLICATION NO. | : 17/411148 | |
| DATED | : December 12, 2023 | |
| INVENTOR(S) | : Steven Joseph Gregorski et al. | |

It is certified that error appears in the above-identified patent and that said Letters Patent is hereby corrected as shown below:

In the Claims

In Column 15, Line 29, in Claim 2, delete "od" and insert -- of --.

Signed and Sealed this
Fourth Day of June, 2024

Katherine Kelly Vidal
*Director of the United States Patent and Trademark Office*